Figure 1:
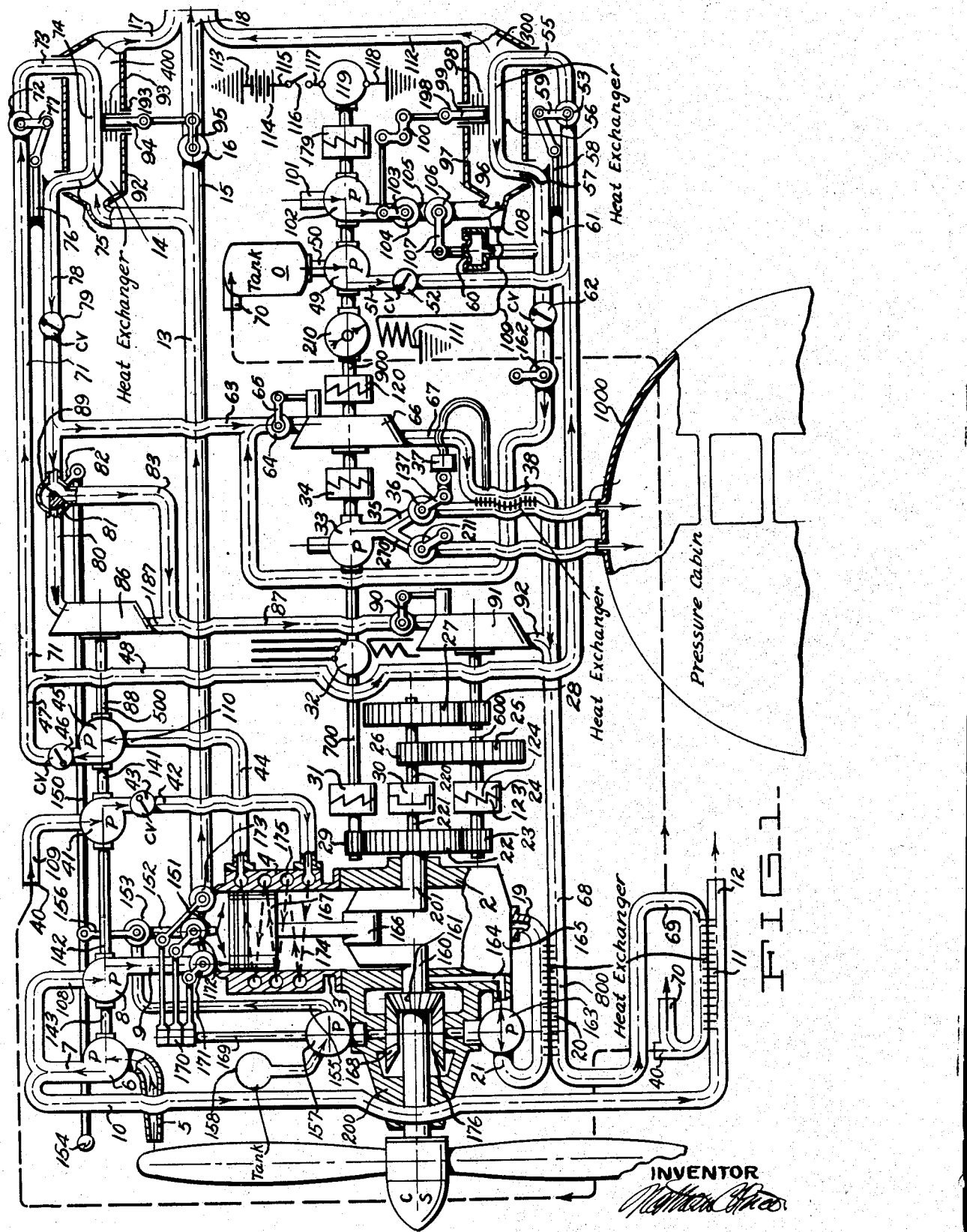

Feb. 20, 1940. N. C. PRICE 2,191,289
BINARY CYCLE POWER PLANT
Filed May 21, 1937 2 Sheets-Sheet 1

INVENTOR

Feb. 20, 1940.  N. C. PRICE  2,191,289
BINARY CYCLE POWER PLANT
Filed May 21, 1937  2 Sheets-Sheet 2
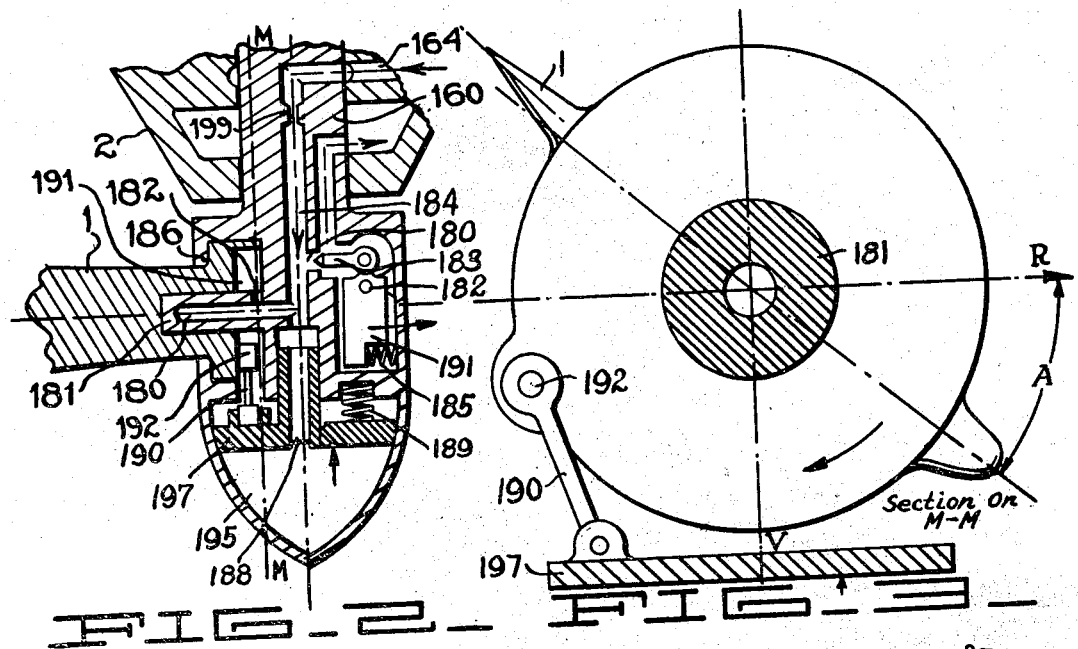
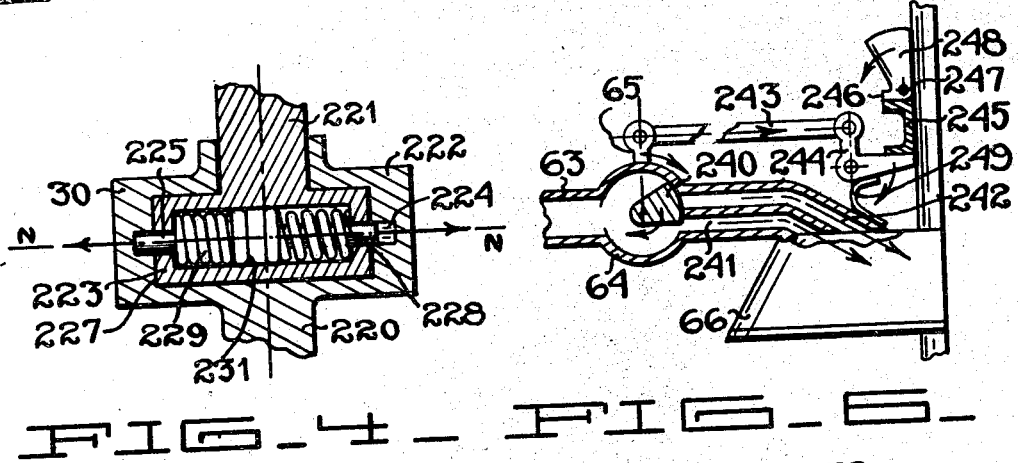
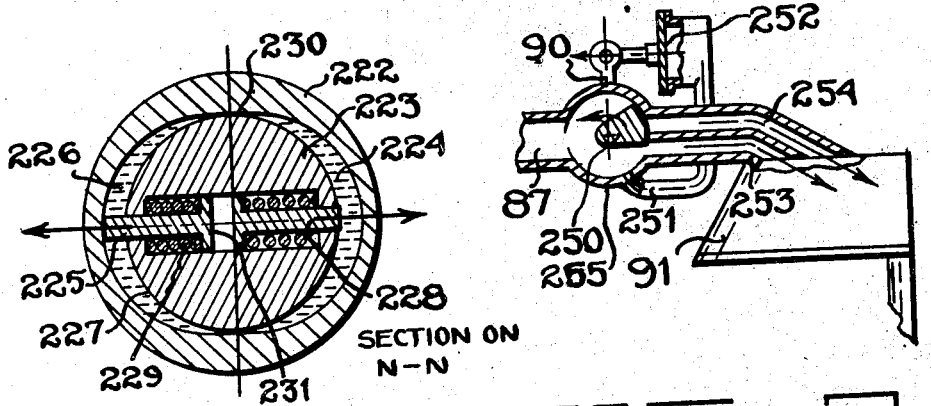
INVENTOR Patented Feb. 20, 1940

2,191,289

UNITED STATES PATENT OFFICE 2,191,289

BINARY CYCLE POWER PLANT

Nathan C. Price, Seattle, Wash., assignor to Sirius Corporation, a corporation of California Application May 21, 1937, Serial No. 144,006

9 Claims. (Cl. 60—11)

My invention comprises a new system for the production of power, which uses two different, but associated, working fluids temporarily brought into heat exchanging relationship during their respective thermodynamic cycles. The principles of my invention may be applied to a variety of binary cycle power plant forms and especially to powerplants for aircraft. While particular reference is made in this specification to the combination of an internal combustion engine supplying waste heat for formation of steam acting as a secondary working fluid, other combinations of fluids might be employed, as, for instance, mercury vapor primary working fluid delivering waste heat to a secondary working fluid as steam.

That the efficiency of heat engines may be extended by enlarging the range of heat availability of the working fluid is basic knowledge. However from practical standpoints this is limited by the particular pressure-temperature relationships of the working fluid, since each single working fluid has a pressure and temperature range beyond which it cannot readily be turned to use. This is principally because of the physical limitations of heat exchanging structures which must be employed at the higher level, and because of the physical limitations of the working fluid and the temperature limitations of the coolant at the lower level.

For aircraft power plants a practical solution is found in the combination of the internal combustion engine with a secondary working fluid, such as steam formed from waste products of a combustion. In this case the initial working temperature of the primary working fluid may be considerably over 4000° F. in the engine cylinder, yet the terminal temperature of the secondary working fluid of the process may be considerably under 200° F. Overall plant thermal efficiency in excess of 40% may therefore be attained without resorting to complicated means.

My invention supplies these thermodynamic advantages under a new type of vapor generation control, and provides a new system of delivering the power produced to a consumer.

Consequently it is the objective of my invention to satisfy the specifications enumerated herewith.

Maximum utilization of the heat of the fuel for power production must be attained to extend the cruising range of the aircraft. For the same reason power for driving aircraft accessories and heat for the aircraft cabin must be derived from final utilization of waste heat of the secondary working fluid. Appropriate automatic regulation of the relative rates of generation and power delivery by the primary and secondary working fluids must be provided.

It is essential that there should be automatic regulation and provision for independent vapor generation and power production from the system of one of the working fluids during emergency failure or shut down of the system of the other and associated working fluid.

In fulfillment of other objectives provision of alternative drives for certain accessories is made from both working fluids so that if one working fluid system becomes inoperative the accessories may continue to be driven by the other.

During normal cruising of the aircraft the accessories are operated by the drives derived from the secondary working fluid, but this load is automatically picked up by the drives from the primary working fluid system if the secondary working system fails.

Independent automatic generation of the secondary working fluid by direct fuel firing may be put into action when the primary working fluid system is idle.

Controllable high speed turbine drives are easily furnished because the internal combustion engine produces generated secondary working fluid. These drives are ideal for superchargers, alternators, and accessory equipment or the like, since they are free from torsional impulses and shock.

Indeed the turbine is a very dependable and compact form of engine and due to the available high speed of operation serves to reduce the size of the driven accessory equipment without heavy and relatively inefficient gearsets.

My invention supplies aircraft having main power for propulsion by a first working fluid with compressed combustion air for the generation of the first working fluid. The power for this compression is derived from the secondary working fluid and the secondary working fluid is generated by the waste heat from the primary working fluid. This is of particular significance from the standpoint of high altitude operation. At the higher altitudes the air supercharging compressor speeds must increase to maintain normal power production and normal rate of generation of the first working fluid compared to that of the lower altitudes. This situation arises from the decrease in density of air with increase in altitude. The supercharging power requirements likewise increase with altitude. It is a characteristic of the waste heat utilization from the primary working fluid that the heat abstraction by the secondary working fluid increases with altitude.

This may be employed by conversion of heat to power to produce constant absolute initial working pressure of the primary fluid and to slightly increase useful expansion ratio of the primary working fluid. Happily the supercharging power requirements of the air blower and the power available from the secondary working fluid tend to approximate each other at any altitude practical for aircraft operation.

Standby cabin heating or ground air conditioning by waste heat from the secondary fluid is available. There is provision for heating of the lubricant of the internal combustion engine prior to and during its starting period. This minimizes the warm-up time required before it is advisable to apply full power of the internal combustion engine for take-off of the aircraft. The secondary fluid power plant may be operated independently for actuating accessories of the aircraft during station at the airport.

Power may be extracted from the secondary working fluid by a turbine for supplying torque at a low speed for starting the internal combustion engine. After the starting, the turbine will continue to contribute power to the internal combustion engine when the engine is operating at normal power output. This turbine power is yielded by excess production of secondary working fluid over and above the requirements for driving of the aircraft accessories and in particular for the engine supercharger.

The mechanism for relative speed change between the turbine and the internal combustion engine is automatic. High rotative speed of the turbine is permitted during both the starting and the normal speed operation of the engine so that high turbine efficiency is maintained at all times.

Figure 1 diagrammatically reveals an aircraft power plant combination of an internal combustion engine for driving a screw propeller, apparatus for generating a secondary working fluid by waste heat and mechanism for operating an accessory drive system as described.

Figure 2 diagrammatically illustrates in section along the propeller shaft axis a suitable and customary automatically variable pitch and constant speed propeller for use in the powerplant of Figure 1.

Figure 3 diagrammatically represents in section normal to the propeller blade axis the construction of the propeller hub to permit control of pitch.

Figure 4 diagrammatically portrays in section along the drive shaft axis an automatic centrifugal clutch for use between the internal combustion engine and a turbine operated by secondary working fluid as in Figure 1.

Figure 5 diagrammatically reveals in section normal to the propeller shaft axis the construction of the centrifugal clutch of Figure 4.

Figure 6 diagrammatically illustrates in section a centrifugal governor turbine speed control for a nozzle box of a turbine for driving aircraft accessories at a constant rotational speed as in Figure 1.

Figure 7 diagrammatically represents in section a nozzle box pressure control for a turbine for starting or contributing power to the internal combustion engine as in Figure 1.

The details of Figure 1 diagrammatically illustrating the power plant are as follows: A propeller 1 preferably of the automatically variable pitch type following customary structure as shown in Figures 2 and 3, for instance, is driven by an internal combustion engine 200. A crankcase 2 supports an internal combustion cylinder 3 surrounded for cooling by a jacket 4. Within the cylinder and crankcase are a piston 167, a connecting rod 166, and a crankshaft 201. Fuel for operation of the engine is supplied from a pump 157 producing pressure in a line 155. The pump is supplied fuel from a tank 158. Admission occurs from the line 155 to a line 152 and thence to a cylinder fuel injection nozzle 151.

Flow control is accomplished through a valve 153 which may be manually adjusted in opening by a lever 156 and by a handle 154, but the injection timing is afforded by a valve 172.

The air induction system for the cylinder 3 comprises a propeller slip stream diffuser, such as an air ram 5 shown in section, for supplying a centrifugal air blower 6. A discharge duct 7 delivers first stage compressed air to an inlet 108 of a second stage centrifugal blower 8. Air is then discharged from this second stage along an induction line 9 and past an inlet valve 171 into the cylinder 3. The degree of supercharging of the cylinder 3 depends partly upon the air ramming effect due to the motion of the airplane, but primarily upon the rotative speed of the blower 6 and the blower 8.

An intake valve 171 times the admission of air into the cylinder 3, while an exhaust valve 173 synchronizes the release of gases of combustion. The proper cyclical motion of the valves 171, 172, 173 is obtained from some cams 170 of a camshaft 169. The camshaft and the pump 157 are driven from a propeller shaft 160 through the medium of some bevel gears 161 and 168.

The exhaust gases from the cylinder 3 are forced from the exhaust valve 173 along a stack 13, which branches into a stack 15, and into a boiler casing 92, shown in section, of a waste heat boiler 400. During operation of the internal combustion engine the gases of combustion may pass either through the casing 92 into a stack 17 to be finally discharged into the atmosphere, or may be allowed to shunt the casing 92. The rate of bypassing through the stack 15 is responsive to the opening of a flow throttling control valve 16.

In the boiler casing 92 are located the heat transfer surfaces for generating the vapor of the secondary working fluid from the waste heat of the primary working fluid exhausted from the cylinder 3.

A condenser 11 supplies the liquified secondary working fluid intended for the boiler along a feed duct 40 to an inlet 109 of a centrifugal pump 41. The pump discharges through a check valve 43 and a conduit 42 to the jacket 4. The secondary working fluid liquid is used as a coolant for the cylinder 3 and is elevated almost to saturation temperature. A coolant passage 175 is preferably tubular and helical in course as indicated by some dotted lines 174. The heated coolant is then forced along a conduit 44 into an inlet 110 of a second stage centrifugal pump 45 and accordingly discharged at a boosted pressure through a check valve 46 into a conduit 47. From the conduit 47 the liquid may flow into some conduits 71 and 48. The flow through the conduit 71 is regulated by a throttling flow control valve 72 and is constrained to pass through a vapor generator inlet 73. A region 74 forms an evaporation zone where the secondary working fluid is progressively converted into vapor through indirect thermal contact with the exhaust gases in the casing 92.

Superheating occurs in a region 75. The superheated vapor is conducted along a conduit 78 through a check valve 79 and into some turbine feed conduits 80 and 63.

The control of generation of the secondary working fluid vapor is partly accomplished by a thermostat 76 thermally related to the feed liquid in the conduit 71 and to the superheated vapor discharged from the region 75.

Accordingly the thermostat 76 is responsive to a temperature intermediate to that of the liquid and to that of the vapor. It is also responsive to the relative rates of flow and to the relative thermal conductivities of the liquid and the vapor. The thermostat 76 actuates a lever 77 tending to open the valve 72 if the temperature of the thermostat 76 is relatively high, but tending to close the valve 72 if the temperature of the thermostat 76 is relatively low.

Basis for this action as an effective method of producing boiler stability is discussed further in my Patent No. 2,119,245, entitled "Boiler regulation", issued May 31, 1938.

The degree of opening of the valve 16 and the related rate of flow of the exhaust gases through the boiler casing 92 is varied by a vaporimeter 193. The vaporimeter comprises a thermally non-expansible pencil 94 enclosed in a finned jacket 93 and abutting the closed end of the jacket 93. The jacket is swept by the exhaust gases and is thermally responsive to the evaporation region 74. Any change of thermal conditions adjacent to the jacket will cause a relative motion between the jacket 93 and the free end of the pencil 94 due to differential thermal expansion. This motion is utilized to vary the opening of the valve 16 by positioning of a lever 95.

The vaporimeter 193 serves to reduce the flow of exhaust gases through the boiler casing 92 if the evaporation zone has tended to recede from the region 74 toward the inlet 73. This is an emergency protection against overheating of the heat exchanging surfaces swept by hot exhaust gases. Normally valve 16 would not be opened unless the flow of feed liquid should have become inadequate. A further description of the function of the vaporimeter for a limit control of gases of combustion is given in my Patent 2,064,494, entitled "Control system" issued December 15, 1936, wherein the vaporimeter is similarly employed to prevent overheating of the boiler tube during deficiency of feedwater supply.

An independently operable vapor generation system for the secondary working fluid is embodied in a boiler 300 having a casing 97 illustrated in section. The conduit 48 supplies liquid to a boiler inlet 55. The inlet 55 may also receive liquid from a system including a supply tank 0, a supply conduit 50, a centrifugal pump 49, a discharge conduit 51, and a check valve 52.

Combustible fuel mixture is forced by a centrifugal pump 102 from a supply conduit 101 into a discharge conduit 105. The flow of the combustible mixture is appropriately varied by some throttling flow control valves 104 and 106 prior to admission into the boiler casing 97. Means for automatically igniting the combustible mixture as it enters the casing 97 is provided by a magneto 210 grounded along a lead 111 and delivering high tension current along a lead 109 to a sparking plug 108.

The control of vapor generation of the secondary working fluid in the independently fired boiler is nearly identical with that of the waste heat utilization boiler 40. The feed liquid is brought into heat absorbing relationship with a thermostat 58 and is regulated by a throttling flow control valve 53 before admission into the inlet 55. Vapor is generated in a region 56 and is superheated in a region 57. The superheated vapor is conducted in heat delivering relationship to the thermostat 58 and in pressure imparting relationship to an elastic pressure diaphragm 60. The vapor progresses along a conduit 61, past a check valve 62 and through a manual throttle 162 into the turbine supply conduit 63.

The thermostat 58 varies the flow of liquid through the valve 53 by operation of a lever arm 59 for appropriately supplying feed liquid to the independently fired boiler 300. A relatively high temperature of the thermostat 58 tends to increase the supply of feed liquid, while a relatively low temperature of the thermostat 58 tends to decrease the supply of feed liquid.

As in the instance of the waste heat boiler 400, and following the same function and construction, a vaporimeter 198 comprising a non-expansible pencil 99 and a finned jacket 98 thermally related to gases of combustion in the boiler casing 97 and to the evaporation region 56, serves as a limit control to regulate the opening of the fuel mixture valve 104 by movement of a lever arm 103 through a bell crank linkage 100.

If the evaporation zone has receded from the region 56 toward the inlet 55, the vaporimeter will tend to close the valve 104 reducing the supply of combustible mixture passing through the conduit 105 and consequently reducing the intensity of combustion within the boiler casing 97. The waste gases of combustion from the boiler casing 97 are delivered along a flue 112 and discharged into the atmosphere together with exhaust gases from the internal combustion engine.

The mechanism which causes the separately fired boiler to automatically supplement the waste heat utilization boiler in formation of vapor of the secondary working fluid in response to the demands of the consumer largely rests in the pressure diaphragm 60. Whenever the boiler 300 is to be made an automatically operable part of the power plant the throttle 162 is left wide open. If, due to inadequacy of supply of vapor from the generator 400, the pressure of the vapor in the turbine supply conduit 63 falls below a predetermined value, the pressure likewise drops in the conduit 61 and is sensed by the diaphragm 60. Then the ineffectively opposed elastic pressure of the diaphragm 60 forces a lever arm 107 to open the valve 106 to initiate or to increase the supply of combustible mixture to the boiler casing 97 thereby augmenting generation of working vapor. When the pressure of the working vapor regains the predetermined normal value in the conduit 80 and in the conduit 61, the pressure of vapor acting under the diaphragm 60 closes the valve 106 reducing or terminating the supply of heat to the boiler 300. The fire is normally controlled by the diaphragm 60 only and the diaphragm maintains substantially constant pressure in the conduit 63 by regulation of the intensity of the fire.

The boiler 300 automatically operates during at least three other power plant conditions as well: (1) when the binary power plant is operated at overload, (2) when the internal combustion engine is not in operation, yet the accessories of the aircraft are on duty, and (3) when the secondary working fluid is relied upon to operate heavily loaded accessories during low power output from the cylinder 3. In case (1) the consumers comprise the accessories, the internal combustion engine coolant pumps and centrifugal blowers, and the screw propeller.

The drive system 500 for the auxiliaries of the primary working fluid portion of the powerplant will now be described. Vapor of the secondary working fluid is admitted to a variable speed turbine 86 under control of a three way valve 81 shown in section. The valve 81 determines the relative amount of bypassing of steam around the turbine 86 and consequently varies the output and speed of the turbine 86. The steam also enters a variable speed turbine 91 either directly from the valve 81 or after passing through and delivering power to the turbine 86. A conduit 83 leading from the valve 81 bypasses the turbine 86 and communicates with a conduit 87 to the turbine 91. Vapor exhausted from the turbine 86 flows along a conduit 187 and enters the conduit 87. The valve 81 is linked to a tie rod 150 by a lever arm 82 so that the handle 154 may be regulated in position simultaneously with that of the fuel supply control. The arm 82 is rotatively joined to a gate 89 which may seal off either the conduit 83 or the conduit 80 from the conduit 78, or may proportion the flow between the two latter conduits.

If it is desired to increase the power output of the internal combustion engine, the operator may shift the handle 154 to open the fuel valve 153 more fully, thus admitting a greater fuel charge into the cylinder 3 with each injection. The motion of the handle is also transmitted along the rod 150 biasing the valve 81 to feed a greater amount of working fluid to the turbine 86 and a lesser amount of directly supplied working fluid to the turbine 91.

The amount of steam which passes through the turbine 86 regulates the speed and output of the coolant pumps 41 and 45 as well as that of the blowers 6 and 8. As the mean effective pressure of the cylinder 3 is raised by the increased supercharging and fuelization, the degree of cooling of the cylinder 3 is automatically increased at the same time.

The turbine 86 drives the second stage coolant pump 45 by a shaft 88, the first stage coolant pump 41 by a shaft 141, the second stage centrifugal blower 8 by a shaft 142, and the first stage centrifugal blower 6 by a shaft 143.

The turbine 91 has a nozzle box pressure control mechanism 90, illustrated in detail in Figure 7, for varying the degree of peripheral admission. Both the turbine 86 and the turbine 91 are limited in speed according to the torque which they deliver.

During standby of the aircraft the turbine 91 may be supplied steam from the independently fired generator 300 for cranking the internal combustion engine 200. Subsequently it may automatically continue to contribute power to the internal combustion engine and to the propeller 1 with a much smaller ratio between the turbine speed and propeller speed than that which existed during starting of the engine 200.

The cycle of operation of the gear train 600 for accomplishing this is described as follows: The handle 154 is placed in a position to allow a small amount of fuel to be supplied to the cylinder 3 in accordance with the opening of the fuel valve 153. Through the linkage of the rod 150 and the lever arm 82 the three-way valve 81 is positioned as shown in Figure 1 to admit a proportionately large amount of working fluid directly to the turbine 91. The torque of the turbine 91 is delivered from a pinion 28 to a gear 27. A pinion 26 integral with the gear 27 drives a gear 25. The gear 25 engages an overrunning clutch 24 which in turn delivers torque to a pinion 23 through some ratchet jaws 124 and 123. The pinion 23 meshes with a gear 22 on the shaft 201 of the internal combustion engine 200 and causes it to be rotated at cranking speed. Three gear reductions are thereby provided with an overall reduction of 500 to 1, for example.

After the engine has been started and brought up to desired speed by manual resetting of the handle 154, a centrifugal clutch 30 between the pinion 26 and the gear 22 becomes automatically engaged at a predetermined speed of rotation of the clutch 30. The details of this clutch are shown in Figures 4 and 5. At all speeds above the predetermined speed the turbine power is directly delivered from the pinion 26 to the gear 22. The pinion and gear rotate at a common speed. During this phase of operation the clutch 24 overrides since the jaws 124 and 123 rotate relative to each other in a non-clutching direction. The pinion 23 revolves at a speed considerably in excess of that of the gear 25. The ratio of turbine speed to internal combustion engine speed may be, for example, 8 to 1.

During both phases of the described operation the turbine 91 is able to remain within a relatively narrow speed range of high efficiency due to the automaticity of the speed reduction changing system.

In an engine lubricant conditioning system 800 exhaust steam from the turbine 91 is restrained to flow along a conduit 92 and thence along a conduit 68 to an oil heat exchanger 20. The exhaust vapor comes into heat transferring relationship with oil from the internal combustion engine crankcase 2. The outflow oil from a crankcase sump 165 flows along a conduit 19 to the heat exchanger 20 and is returned to the crankcase 2 through a conduit 21 by way of an engine pump 163 and a bearing lubrication line 164. The pump 163 is driven by a bevel gear 176, which meshes with the bevel gear 161. Steam which has been exhausted from the turbine and has passed through the heat exchanger 20 is subsequently led through a conduit 69 to a secondary condenser 11.

During the starting period of the internal combustion engine the exhaust vapor contributes heat to the engine lubricant reducing the time required for warming up. After continuous running a condition of equilibrium is reached with the engine lubricant contributing heat to the exhaust working fluid instead. This heat is subsequently dissipated in the secondary condenser 11. Thus, during all phases of operation of the internal combustion engine, approximately constant lubricant supply temperatures are maintained in the crankcase 2.

The drive of an aircraft accessories assembly 700, comprising an alternator 32 and a cabin supercharger 33, is accomplished in the following manner: Steam from the turbine supply conduit 83 is delivered to a constant speed turbine 66 provided with a speed governing nozzle box control mechanism 65 for varying the degree of peripheral admission. The construction is shown in detail in Figure 6 whereby the speed is maintained within a fraction of one percent.

Exhaust steam from the turbine 66 is led through a conduit 67 into a primary condenser 38 and is subsequently added to the exhaust vapor from the turbine 91. The turbine 66 drives the cabin supercharger 33 and the alternator 32 through an overrunning clutch 34.

In the event of failure of the turbine 66 the internal combustion engine 200 will operate the cabin supercharger 33 and the alternator 32. The latter drive is accomplished by an overrunning clutch 31 integral with the pinion 29, which is in engagement with the gear 22.

This emergency operation of the aircraft accessories is accomplished at a relatively low speed and in constant ratio to the speed of the engine 200. During the normal turbine driven operation the speed of the accessories is higher than that of the pinion 29.

The cabin supercharger 33 forces air along a duct 35, which is regulated by a throttling flow control valve 36. The valve 36 is controlled by motion of a lever arm 137 under the influence of a pressure diaphragm 37. The diaphragm 37 resembles the diaphragm 60 and is responsive to exhaust vapor pressure in the primary condenser 38.

During relatively high condenser pressures the diaphragm 37 is urged by the pressure of vapor to open the valve 36 and to increase the flow of air. This reduces and corrects the condenser pressure. Accordingly substantially constant condenser pressure is maintained and the power consumed by the blower 33 partly corresponds to that required to hold the condenser pressure down to the normal value. An air outlet duct 39 from the condenser may supply heated compressed air to an aircraft cabin 1000. A duct 270 from the cabin supercharger 33 supplies unheated compressed air to the aircraft cabin. Flow through this duct is regulated by a throttling flow control valve 271 under regulation of the cabin supercharging controls.

An outlet 12 is provided for the heated air discharged from the main condenser 11. This heated air may be conducted to certain aerodynamic surfaces of the aircraft to inhibit ice formation. A condensate outlet duct 70 discharges to the secondary working liquid storage tank 0.

The turbine 66 drives a system 900 of secondary working vapor generation accessories through an overrunning clutch 120. These accessories comprise the magneto 210, the centrifugal feed pump 49, and the combustible mixture pump 102.

The independently fired vapor generation system may be started when all other portions of the binary vapor power plant are inoperative, by the following method: A switch 116 is closed, and a battery 114 grounded by a lead 113 delivers current along some leads 115 and 117 to an electric motor 119. The electric motor 119 is grounded by a lead 118. Power is imparted through an overrunning clutch 179 to the pump 102, the pump 49, and the magneto 210. During this electric starting phase the clutch 120 overrides and the turbine 66 is not rotated, thereby minimizing starting current requirements.

Since aircraft which function throughout a considerable altitude range do require a variable pitch and constant speed propeller for the most efficient and practical operation, I have illustrated my invention with such a propeller. The construction represents that which is in present day use in aircraft, for example as characterized in the Patent No. 1,893,612 to Caldwell dated January 10, 1933. In Figure 2 the main details include a propeller 1 retained by a hub 186 and aligned by a spindle 181. The hub is joined to the propeller shaft 160 mounted in the crankcase 2. Oil under pressure is supplied to a duct 199 of the shaft from the bearing lubrication line 164.

A fly-weight 191 is enclosed within the hub 186 and mounted on a fulcrum 182 of the hub. The fly-weight and the fulcrum are eccentrically located with respect to the shaft 160 in order that the centrifugal force of the fly-weight may be resolved along the axis of a throttling pin 183 to vary the opening for the escape of oil from the duct 199 into a relief duct 184 of the shaft at a by-pass orifice 180. The fly-weight is primarily restrained in its tendency toward outward motion by a spring 185 which tends to pry the pin 183 away from the orifice 180.

The described system tends to build up hydraulic pressure abruptly in the duct 199 if the propeller shaft speed increases but slightly beyond the point at which the fly-weight overcomes the spring. Conversely a comparatively small decrease in propeller shaft speed relieves the pressure in the duct 199 abruptly. The change of hydraulic pressure, as illustrated in Figures 2 and 3, is employed to twist the propeller 1 about its own axis to govern propeller speed. An increase in propeller speed causes an upward surge of hydraulic pressure to extend from the duct 199 along an axial bore 188 of a reciprocable piston 197 into a hydraulic cylinder 195 associated therewith. The piston 197 is displaced axially as this force increases thereby compressing a coil spring 189 and twisting the propeller 1 into steeper pitch by means of a connecting rod 190 joined to an off-center pin 192 at the base of the propeller.

In Figure 3, R designates the direction of rotation of the propeller, V designates the direction of motion of the aircraft and A designates the angle of inclination of the propeller 1 which is increased by pressure surge in the cylinder 195.

Any tendency of propeller speed to decrease below the normal setting is offset by reduction of hydraulic force in the cylinder 195, which allows the spring 189 and the restoring effort of the propeller 1 acting about its own axis to move the piston 197 in opposition to the oil which becomes expelled from the cylinder 195 backward thru the bore 188 and out the orifice 180.

The arrows in Figures 2 and 3 represent the direction of motion of the oil and of the elements of the mechanism during a governing phase brought about to correct an excess of propeller shaft rotational speed.

Figures 4 and 5 diagrammatically represent a suitable construction for the centrifugal clutch 30 of Figure 1.

The driving elements joined to the pinion 26 comprise a shaft 220 and a drum 222. The drum is formed internally into a cylindrical space 227 coaxial with the shaft 220, but midway of the length of the space is an elliptical groove 224 filled with an appropriate liquid such as oil, and having a minor axis equal to the diameter of the space at a point 230.

The driven elements joined to the gear 22 comprise a shaft 221 and a cylinder 223. The cylinder 223 fills the cylindrical space 227 and is free to rotate within it. However a pin 225 and a pin 228 mate with the groove 224, if the centrifugal force is sufficient to compress a coil spring 229 under a shoulder 231 as is shown to be the case in the illustration of the position of the pin 225. Thereupon oil is trapped in a region 226 between the pin 225, the cylinder 223, and the drum 222, and the shafts 220 and 221 become locked together. The speed of the shaft 221 required to produce this locking is less than the cruising speed of the engine 200, so that during normal aircraft operation the turbine 91 may contribute power to the engine.

For purpose of further illustration the pin 228 is shown in a position corresponding to a very low speed of the shaft 221, in which case the pin 228 is retracted by the coil spring and the drum 222 is free to rotate at a higher speed than that of the cylinder 223. This corresponds to the condition of the engine starting period when the turbine 91 is cranking the engine 200 through the clutch 24 and the shaft 220 rotates at a much higher speed than that of the engine.

Figure 6 diagrammatically illustrates the details of the speed governing nozzle box control mechanism 65 of Figure 1, in section. A centrifugal weight 248 pinned to the turbine shaft by a fulcrum 247 tends to move outward from the shaft with increase of turbine speed. This outward movement is resolved into rotation of a shoulder 246, sliding of a collar 245, deflection of a leaf spring 249, rotation of a bell crank 244, pull of a rod 243, rotation of a lever 290, and progressive closure of some nozzles 242 and 241 by a gate 240 of the valve 64. The motions indicated by arrows in the illustration correspond to corrective measures for excessive turbine speed.

The degree of closure of the nozzles is dependent upon the turbine speed, and since the action of the flyweight in deflecting the spring 249 may be made as abrupt as is desired, the variation of the turbine speed may be held to close limits.

When the turbine speed tends to fall below normal, the weight is held against the shaft by the force of the spring 249, and consequently the gate 240 is swung into a position which does not obstruct the free flow of steam through the nozzles 242 and 241. This reestablishes the normal turbine speed.

Figure 7 diagrammatically reveals the details of the nozzle box pressure responsive control mechanism 90 of Figure 1, in section.

This control maintains a constant pressure in the valve 255 regardless of the rate of steam supply. Due to the essentially constant speed of the turbine 91, which is normally held in fixed speed relationship to the engine 200 by the centrifugal clutch 30, this constant pressure is desirable from the efficiency standpoint.

If a relatively large rate of steam supply is impressed on the turbine, the pressure will tend to rise in the valve 255, in the conduit 251, and behind a flexible diaphragm 252. The resultant bulging of the diaphragm forces a lever 90 and a gate 250 in the direction indicated by arrows opening a turbine nozzle 254 more fully and thus tending to restore the normal pressure in the valve 255.

During relatively small rates of steam supply normal pressure will likewise be maintained in the valve 255, for, if the pressure tends to drop, the diaphragm will tend to force the gate 250 to shut off the nozzle 254. Normal velocity will still remain in a nozzle 253 so that the turbine efficiency will be but slightly impaired by the smaller rate of steam supply.

I claim:

1. A binary cycle power plant comprising a power consumer, a first engine for contributing power to said consumer, a first working fluid at a relatively high temperature level for operating said first engine, a combustion chamber for producing heat to generate said first fluid, a blower for forcing air into said chamber, a conduit for admitting fuel into said chamber, a second engine for contributing power to said first engine, a second working fluid at a relatively low temperature level for operating said second engine, a heat exchanger for generating said second fluid by waste heat from said first fluid, an impeller for forcing feed liquid of said second fluid into said exchanger, a device sensitive to thermal conditions in said exchanger for regulating said impeller, a boiler for generating said second fluid by direct firing, a fuel burner for said boiler, a pump for forcing feed liquid of said second fluid into said boiler, an instrument sensitive to temperature conditions of said second fluid in said boiler, for regulating said pump, a manifold for conducting said second fluid from said exchanger and from said boiler to said second engine, a regulator for the heat output of said burner, and apparatus sensitive to pressure of said second fluid in said manifold for controlling said regulator.

2. A power plant as defined in claim 1 and further characterized by a flow course for said second fluid in said exchanger, a flow passage for said second fluid in said boiler, and said course and said passage being connected in parallel to said manifold.

3. A power plant system for an aircraft comprising a propeller for propulsion, an aircraft accessory power consumer, a first engine for driving said propeller, a first working fluid at a relatively high temperature level for operating said first engine, a combustion chamber for producing heat to form said first fluid, a second engine for driving said consumer, a second working fluid at a relatively low temperature level for operating said second engine, a heat exchanger for generating said second fluid by waste heat extracted from said first fluid, a boiler for producing said second working fluid by direct firing, a fuel burner for said boiler, a manifold for conducting said second fluid from said exchanger and from said boiler to said second engine, a heat output regulator for said burner, and an apparatus responsive to the pressure of said second fluid in said manifold for controlling said regulator.

4. A power plant system for an aircraft comprising a propeller for propulsion, an aircraft accessory power consumer, a first engine for driving said propeller, a first working fluid at a relatively high temperature level for operating said first engine, a combustion chamber for producing heat to form said first fluid, a second engine for driving said consumer, a second working fluid at a relatively low temperature level for operating said second engine, a heat exchanger for generating said second fluid by waste heat extracted from said first fluid, a passenger cabin of the aircraft, a boiler for forming said second fluid by direct firing, a fuel burner for said boiler, a manifold for transferring said second fluid from said exchanger and from said boiler to said second engine, a heat output regulator for said burner, an apparatus responsive to the pressure of said second fluid in said manifold for controlling said regulator, a condenser for said second fluid being discharged from said second engine, and means for transmitting the heat dissipated by said condenser to said cabin.

5. A power plant system for a pressure cabin aircraft comprising a propeller for propulsion, a pressure cabin, a pressure cabin supercharger, a first engine for driving said propeller, a first working fluid at a relatively high temperature level for operating said first engine, a generating apparatus for forming said first working fluid, a second engine for driving said supercharger, a second working fluid at a relatively low temperature level for operating said second engine, a heat exchanger for generating said second fluid by waste heat extracted from said first fluid, a boiler for forming said second fluid by direct firing, a fuel burner for said boiler, a manifold for transferring said second fluid from said exchanger and from said boiler to said second engine, a regulator for the heat output of said burner, a device responsive to the pressure of said second fluid in said manifold for controlling said regulator, an air conduit from said supercharger to said cabin, a condenser for cooling said second fluid being discharged from said second engine, and said condenser being interposed in said conduit in heat contributing relationship to the air being supplied to said cabin.

6. A binary cycle power plant for a craft comprising a propeller for propulsion, a first engine for driving said propeller, a first working fluid at a relatively high temperature level for operating said first engine, a combustion chamber for producing heat to generate said first fluid, a duct for supplying fuel to said chamber, a pump for supplying air to said chamber, an overrunning clutch for contributing power to said first engine, a centrifugal clutch for contributing power to said first engine, a device in said centrifugal clutch responsive to the speed of said first engine for engaging said centrifugal clutch at a predetermined and relatively high speed, a second engine connected to said centrifugal clutch and to said overrunning clutch in driving relationship thereto, a second working fluid at a relatively low temperature level, a heat exchanger for generating said second fluid by waste heat extracted from said first fluid, a boiler for producing said second working fluid by direct firing, a burner system for heating said boiler, a manifold for conducting said second fluid from said exchanger and from said boiler to said second engine, and an apparatus sensitive to the pressure of said second fluid to said manifold for controlling said burner system.

7. In a binary cycle power plant for a high altitude aircraft, a propeller for propulsion, a first engine for driving said propeller, a first working fluid at a relatively high temperature level for driving said first engine, a combustion chamber for producing heat to generate said first fluid, a conduit for admitting fuel into said chamber, a blower for forcing air into said chamber, a second engine for driving said blower, a second working fluid at a relatively low temperature level for operating said second engine, a heat exchanger for generating said second fluid by waste heat extracted from said first fluid, a flow course for said second fluid in said exchanger, a duct for connecting said course to said second engine, a flow control device in said duct, a fuel flow control apparatus associated with said fuel conduit and means for operatively joining said device to said apparatus.

8. A binary cycle power plant for a high altitude aircraft comprising a propeller for propulsion, a first engine for driving said propeller, a first working fluid at a relatively high temperature level for operating said first engine, a combustion chamber for producing heat to generate said first fluid, a blower for forcing air into said chamber, a conduit for admitting fuel into said chamber, a second engine for driving said blower, a third engine for contributing power to said first engine, a second working fluid for operating said second and said third engines, a heat exchanger for generating said second fluid by waste heat extracted from said first fluid, a flow course for said second fluid in said exchanger, a manifold for connecting said course to said second and third engines, and a distributor in said manifold for varying the relative amount of said second fluid fed to said second engine as compared to that fed to said third engine.

9. A propulsion system comprising a first power plant operated by a first working fluid at a higher temperature level, a second power plant operated by a second working fluid at a lower temperature level, means for bringing said first working fluid into heat transferring relationship with said second working fluid, a first valving device for regulating fuel admission to said first power plant, a second valving device for controlling flow of said second working fluid in said second power plant, and means for operatively joining said first valving device to said second valving device.

NATHAN C. PRICE.